United States Patent
O'Reilly, Jr. et al.

(10) Patent No.: US 11,693,696 B2
(45) Date of Patent: Jul. 4, 2023

(54) TECHNIQUES FOR COMMAND EXECUTION USING A STATE MACHINE

(71) Applicant: EMC IP Holding Company LLC, Hopkinton, MA (US)

(72) Inventors: Daniel K. O'Reilly, Jr., Framingham, MA (US); Matthew P. Jean, Shirley, MA (US); Michael J. Burns, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 230 days.

(21) Appl. No.: 17/018,369

(22) Filed: Sep. 11, 2020

(65) Prior Publication Data

US 2022/0083371 A1    Mar. 17, 2022

(51) Int. Cl.
*G06F 11/00*    (2006.01)
*G06F 9/48*     (2006.01)
(Continued)

(52) U.S. Cl.
CPC ............ *G06F 9/4881* (2013.01); *G06F 9/541* (2013.01); *G06F 11/076* (2013.01);
(Continued)

(58) Field of Classification Search
CPC ............ G06F 11/0727; G06F 11/0751; G06F 11/0754; G06F 11/076; G06F 11/0793; G06F 11/1415; G06F 11/1438; G06F 11/1471; G06F 11/1474; G06F 11/28; G06F 11/3006; G06F 11/3466; G06F 9/4881;
(Continued)

(56) References Cited

U.S. PATENT DOCUMENTS 8,560,889 B2 * 10/2013 Behrendt .............. G06F 11/203
                                                            714/26
10,331,418 B2 * 6/2019 Wood ........................ G06F 8/60
(Continued)

OTHER PUBLICATIONS

Kufner, Josef, and Radek Mank. "Restful State Machines and SQL Database." IEEE Access 7 (2019): 144603-144617. (Year: 2019).*
(Continued)

*Primary Examiner* — Anthony J Amoroso
(74) *Attorney, Agent, or Firm* — Muirhead and Saturnelli, LLC

(57) ABSTRACT

Techniques for processing a request may include: providing tasks to a state machine framework, wherein the tasks perform processing of a workflow for servicing the request; generating, by the state machine framework, a state machine for processing the request, wherein the state machine includes states associated with the tasks, wherein generating the state machine may include automatically determining a first state transition of the state machine between a first and a second of the states; receiving the request; and responsive to receiving the request, performing first processing using the state machine to service the request. The framework may automatically generate triggers that drive the state machine to determine subsequent states in accordance with defined state transitions. State machine internal state information may be persistently stored and used in restoring the state machine to one of its states in connection processing of the command.

18 Claims, 9 Drawing Sheets

(51) Int. Cl.
*G06F 9/54* (2006.01)
*G06F 11/14* (2006.01)
*G06F 16/23* (2019.01)
*G06F 11/28* (2006.01)
*G06F 11/07* (2006.01)

(52) U.S. Cl.
CPC ...... *G06F 11/0727* (2013.01); *G06F 11/0751* (2013.01); *G06F 11/0793* (2013.01); *G06F 11/1415* (2013.01); *G06F 11/1474* (2013.01); *G06F 11/28* (2013.01); *G06F 16/2379* (2019.01); *G06F 2201/805* (2013.01)

(58) Field of Classification Search
CPC .. G06F 9/541; G06F 16/2308; G06F 16/2379; G06F 2201/805
See application file for complete search history.

(56) References Cited

U.S. PATENT DOCUMENTS

| | | | |
|---|---|---|---|
| 10,437,635 B2 * | 10/2019 | Layman | G06F 11/3006 |
| 2006/0259673 A1 * | 11/2006 | Bancel | G06F 11/28 |
| | | | 714/E11.178 |
| 2021/0149766 A1 * | 5/2021 | Arumugam | G06F 9/4881 |

OTHER PUBLICATIONS

Wikipedia, "Finite-state machine," https://en.wikipedia.org/wiki/Finite-state machine, Aug. 2020.

\* cited by examiner

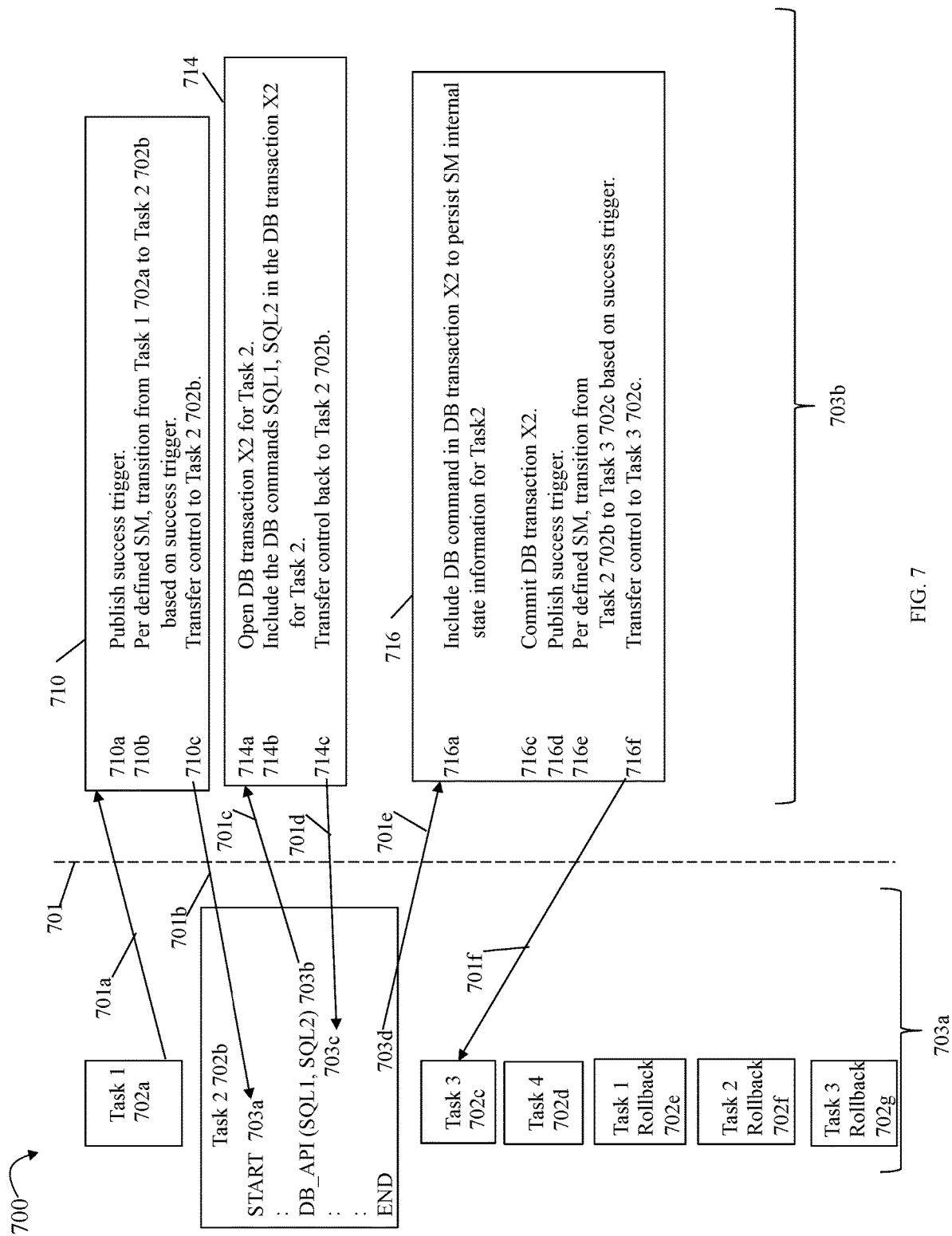

TECHNIQUES FOR COMMAND EXECUTION USING A STATE MACHINE

BACKGROUND

Technical Field

This application generally relates to state machines.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for processing a request comprising: providing a plurality of tasks to a state machine framework, wherein the plurality of tasks perform processing of a workflow for servicing the request; generating, by the state machine framework, a state machine for processing the request, wherein the state machine includes a plurality of states associated with the plurality of tasks, wherein said generating includes automatically determining a first state transition of the state machine between a first of the plurality of states and a second of the plurality of states; receiving the request; and responsive to receiving the request, performing first processing using the state machine to service the request. Processing may include issuing one or more application programming interface (API) calls to the state machine framework, wherein the one or more API calls provide the plurality of tasks to the state machine framework. The plurality of tasks may have sequential order denoting an order in which the plurality of tasks are executed when servicing the command, and wherein the sequential ordering may be determined by the state machine framework in accordance with the one or more API calls.

In at least one embodiment, generating the state machine may include automatically determining a plurality of state transitions of the state machine in accordance with the sequential ordering. Generating the state machine may include converting each of the plurality of tasks into a different one of the plurality of states. Processing may include providing a plurality of rollback tasks to the state machine framework, where each of the plurality of rollback tasks reverses processing performed by one of the plurality of tasks, wherein the plurality of rollback tasks are provided to the state machine framework in the one or more API calls, and wherein the state machine framework converts the plurality of rollback tasks to a second plurality of states of the state machine. Generating the state machine may include automatically determining a second plurality of state transitions of the state machine to perform rollback processing for the plurality of states. The second plurality of transitions may be automatically determined by the state machine framework in accordance with the plurality of tasks and the plurality of rollback tasks. The plurality of rollback tasks and the plurality of tasks may be user-supplied code entities not included in the state machine framework.

In at least one embodiment, the first processing may include performing processing of a first of the plurality of tasks corresponding to the first state of the state machine. Performing processing of the first task may include issuing a first plurality of instructions that perform a first plurality of updates to a database, and wherein the first plurality of instructions are included in a database transaction that atomically performs the first plurality of updates to the database. The database transaction may include one or more instructions that persistently store SM internal state information for the first task. Processing may include committing the database transaction, and wherein committing the database transaction may include atomically updating the database in accordance with the one or more instructions and also the first plurality of instructions. Processing may include determining that the first task completes successfully; and responsive to determining that the first task completes successfully, generating a success trigger that drives the state machine into the second state in accordance with the first state transition.

In at least one embodiment, processing may include: determining that an error occurs when the database transaction is open and not yet committed to the database; responsive to said error, incrementing a retry count denoting a number of times processing of the first task has resulted in an error; determining whether a retry count associated with the first task exceeds a maximum; and responsive to said determining that the retry count exceeds the maximum, generating a failure trigger that drives the state machine into a next state in accordance with a second transition of the state machine, wherein the next state corresponds to a first of the plurality of rollback tasks that reverses processing performed by an associated one of the plurality of tasks. Responsive to determining that the retry count does not exceed the maximum, processing may include generating a retry trigger that drives the state machine into the first state in accordance with a second state transition of the state machine, wherein the second state transition may be a loopback transition that causes the state machine to remain in the first state and repeat processing of the first task. The database transaction that is opened may be aborted responsive to the error. The retry count may be included in SM internal state information for the first task that is persistently stored in the database as a result of committing a second database transaction that stores the SM internal state information for the first task to the database.

In at least one embodiment, the command is a data storage system management command issued over a control or data path. The first processing to service the command using the state machine may be performed on a system, the system may crash while performing processing of the first task for a first of the plurality of states, and processing may include restarting the system and resuming processing to service the command at the first task in accordance with restored SM internal state information.

BRIEF DESCRIPTION OF THE DRAWINGS

Features and advantages of the present invention will become more apparent from the following detailed description of exemplary embodiments thereof taken in conjunction with the accompanying drawings in which:

FIG. 7 is an example illustrating transfers of control and interactions between user supplied code entities and the SM framework for a SM in an embodiment in accordance with the techniques herein.

DETAILED DESCRIPTION OF EMBODIMENT(S)

Figure 1:
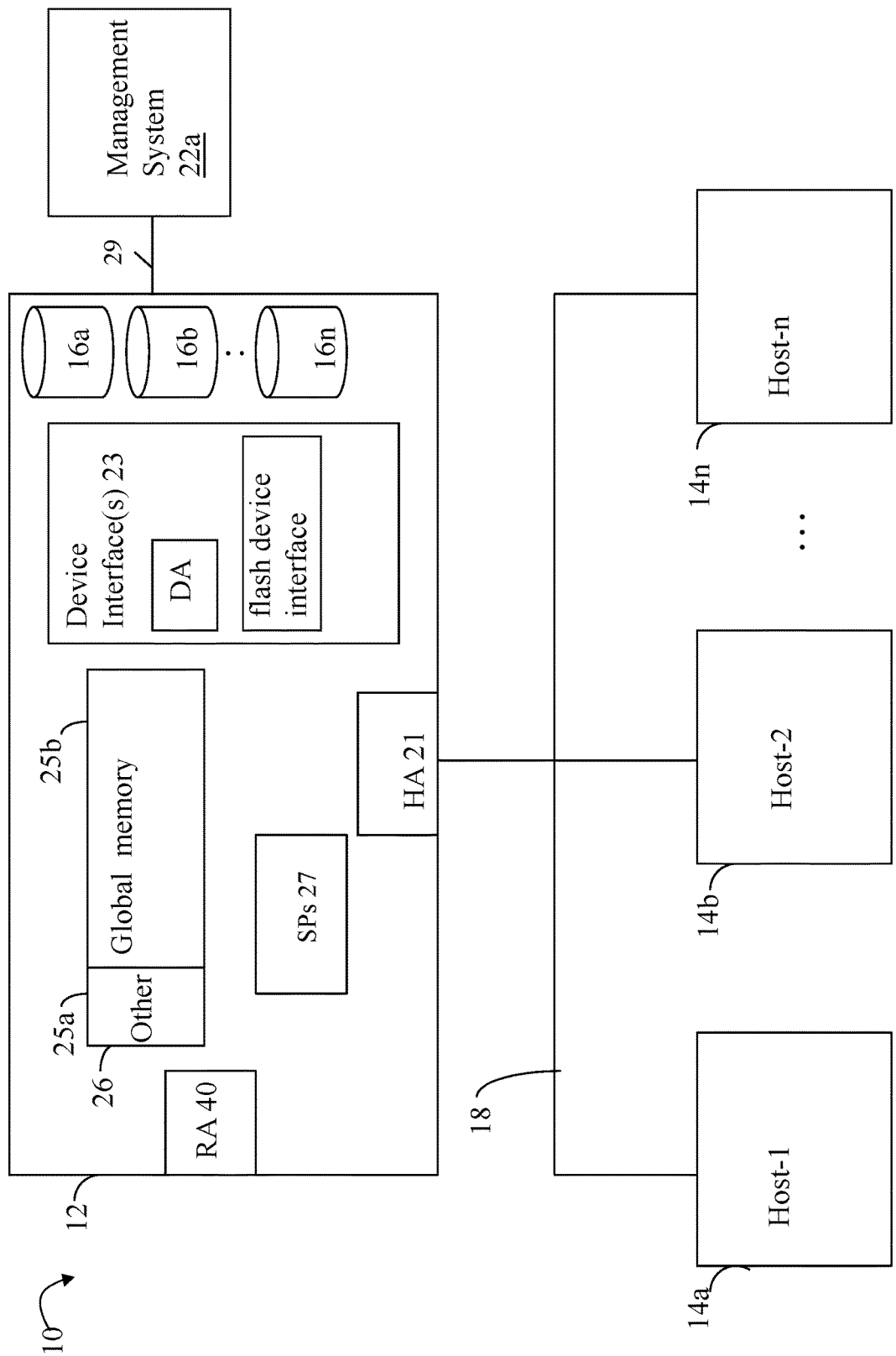
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other conditions identifying when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2:
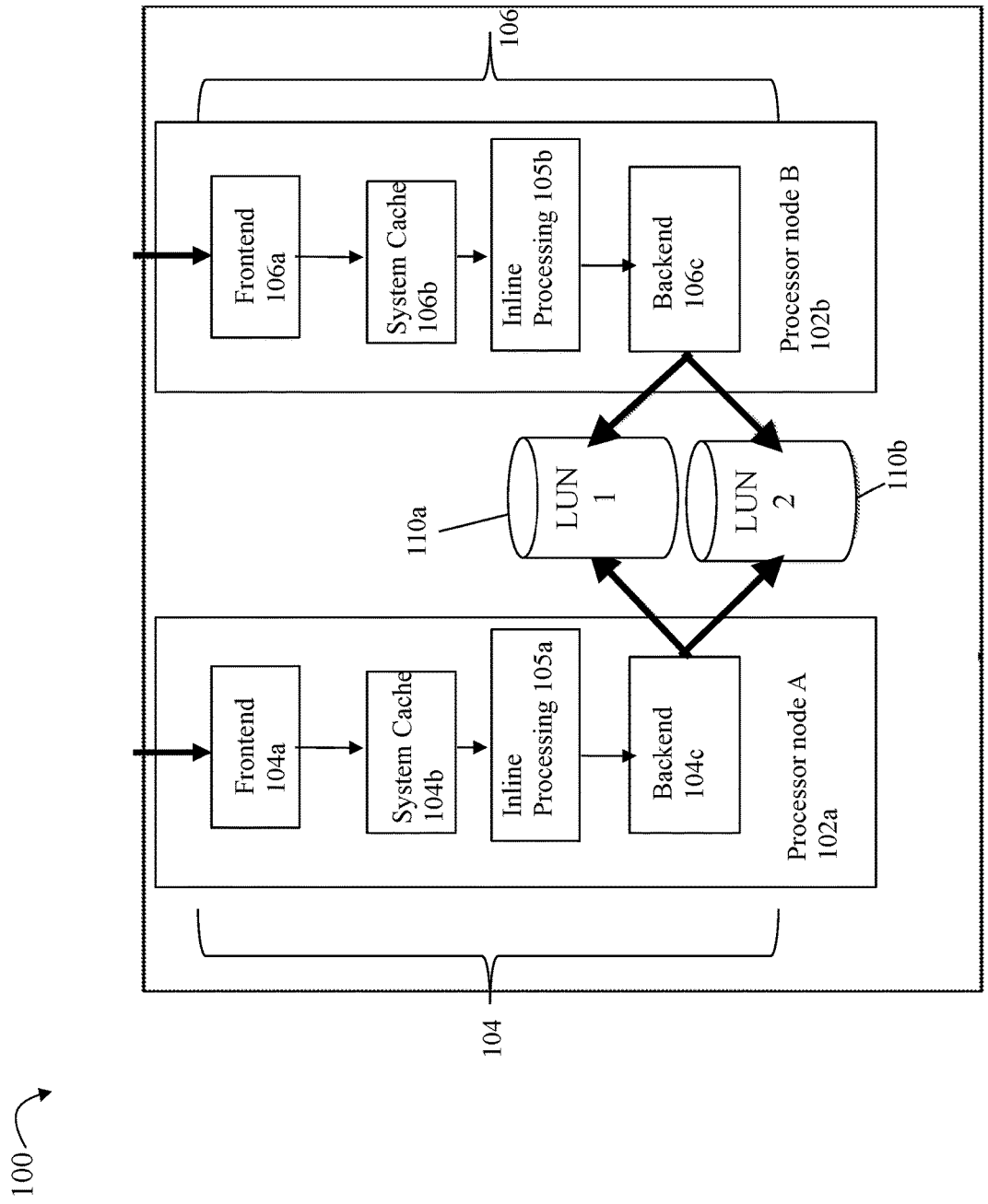
FIG. 2 is an example illustrating the I/O path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processor nodes A 102a and B 102b and the associated software stacks 104, 106 of the data path, where I/O requests may be received by either processor node 102a or 102b. In the example 200, the data path 104 of processor node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and permanent non-volatile storage (e.g., back end physical non-volatile storage devices accessed by BE components such as DAs as described herein). During movement of data in and out of the system cache layer 104b (e.g., such as in connection with read and writing data respectively, to physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data duplication or data compression. The inline processing may include performing any suitable or desirable data processing operations as part of the I/O or data path.

In a manner similar to that as described for data path 104, the data path 106 for processor node B 102b has its own FE component 106a, system cache layer 106b, inline processing layer 105b, and BE component 106c that are respectively similar to the components 104a, 104b, 105a and 104c. The elements 110a, 110b denote the physical storage provisioned for the LUNs whereby an I/O may be directed to a location or logical address to read data from, or write data to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processor node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b may be stored in a modified form where processing is performed by 105a to restore or convert the modified form of the data to its original data form prior to returning the requested read data to the host.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage. For example, in at least one embodiment, a RAM based memory may be one of the caching layers used as to cache the write data that is then flushed to the backend physical storage. When the processor performs processing, such as in connection with the inline processing 105a, 105b as noted above, data may be loaded from the main memory and/or other lower cache levels into its CPU cache.

When processing requests, such as management commands for data storage management on the control or management path, the requests may be processed in a reliable and consistent manner. For example, such a request received on the data storage system may be either fully processed and complete, or if the request cannot be completely processed, any intermediate steps taken during processing to implement or service the request may be reversed or undone. The reversal of the intermediate steps may be performed, if desired, in an attempt to place the system in the same state as prior to processing the request. The request may fail to be completely processed, for example, due to a failure in connection with performing one of the intermediate steps in connection with servicing or implementing the request. The foregoing generally characterizes the atomicity of the request whereby all steps executed to service or implement the request are performed, or none of the steps are completed. To leave the system in a state where less than all the steps of the request are completed may leave the system in an undesirable inconsistent state. It may be desirable that the system attempt to maintain such consistency, and either completely perform all the steps needed to implement the request or otherwise perform none of the steps, even when the software or system processing the request is rebooted, restarted or otherwise crashes (e.g., where the system and software experiences a failure and stops functioning or where an unrecoverable error occurs).

At a finer level of granularity, another aspect of reliability and consistency may be maintained per step of a process. Each single step may include performing multiple sub-steps whereby either all sub-steps of the single step are completed, or if an error occurs during performing one of the sub-steps, processing may undo or reverse the sub-steps performed up to the point of error. It may be desirable that the system attempt to maintain such consistency and either completely perform all the sub-steps of a particular task it step, or otherwise leave the system in a state as if no sub-step of the step or task had been executed. The foregoing generally characterizes the atomicity of each step or task whereby all sub-steps needed to implement the single step or task are performed, or none of the sub-steps are completed.

Described in following paragraphs are techniques that provide for use of state machines (SMs) in connection with developing business logic to implement commands, such as data storage system management commands of the control or management path. In at least one embodiment, the SMs may be characterized as self-persisting, transactional state machines that facilitate satisfying reliability requirements when developing the business logic for command implementation. In such an embodiment, a framework or infrastructure may be provided for use by the user or developer implementing the business logic performed at run time when a command is executed. The user or developer may provide code entities, such as tasks or functions, that implement steps of the command and also implement other operations, such as processing to rollback or undo processing of the steps. The framework or infrastructure may provide for generating a SM in accordance with the user-provided code entities. For example, tasks or functions corresponding to command steps and rolling back or undoing a command step may be converted into states of the SM.

In at least one embodiment, the SM generated by the framework or infrastructure may ensure that the command executes reliably, for example, by ensuring that every step in the execution process of the command runs atomically. In such an embodiment, each step may be represented as a state in the SM. A system crash, an unrecoverable error, or more generally an event may occur when processing a step of the command. The event may cause the system or software executing thereon stop functioning or more generally enter an unhealthy state so that processing performed by the user supplied code entities and the framework stops. Subsequent to the system crash or other event causing the stoppage, execution of the command may resume at the step during which the stoppage, (e.g., crash or other event) occurred. In at least one embodiment, when the system has been restarted, the SM will resume execution at the start of whatever state was being executed at the time of the crash or stoppage. Additionally, in at least one embodiment, if an error occurs during execution of a step of a command where the error results in generating a failure trigger, previously executed steps are undone if desired. Additionally, the SM infrastructure may decide when it needs to persistently store its own progress or state for use in order to preserve reliability. The framework or infrastructure that generates the SM may also provide transitions between some states, such as for state success and failure outcomes, and automatically publish or fire triggers at run time to drive the transitions.

The foregoing and other aspects of the techniques herein are described in more detail in following paragraphs.

In following paragraphs, examples are provided with respect to management commands or requests in a data storage system. More generally, the techniques herein may be used in connection with any suitable command or request. Even more generally, the techniques herein may be used in connection with modeling any suitable behavior or processing having discrete steps that can be represented as states in the SM.

In following paragraphs, examples are provided of particular triggers automatically generated internally by the SM framework. More generally, triggers sent into the SM that drive the SM may be generated or published from any suitable source. Triggers driving the SM may also be generated or published by a specified code entity or task corresponding to a state, where the code entity or task may also generate or publish a trigger. Additionally, triggers driving the SM may also be generated or published from an external source that is external to the SM framework and external to the code entities provided by the user, for example, for the various states. For example, in at least one embodiment, a trigger may be published or generated to pause or halt operation of the SM due to a user request, such as a user-specified selection from a GUI or other interface. In such an embodiment, an API of the SM framework may be provided, where the API is invoked to deliver a trigger to the generated SM at runtime when the SM and SM framework are invoked to process, implement or service a command. Thus an embodiment in accordance with the techniques herein may utilize the internal SM triggers automatically generated by the SM framework to drive the SM between its transitions, may utilize SM triggers generated by developer provided tasks or code entities for the various states, and may also utilize SM triggers generally generated from other sources external to the SM framework and developer provided code entities (e.g., an event such as a user request to terminate or pause the SM may result in a trigger to halt or pause runtime command processing being performed by the SM).

Generally, a SM may be represented using a set of states and state transitions (also sometimes referred to as transitions) that connect various states to one another. A SM may be represented graphically where the states are nodes of the graph. A transition from a source state to a target state may be represented using a directional arrow from the source to the target state. Thus, transitions between states may be denoted as directed arrows, edges or vertices in the graph. Generally, a transition may be between two different nodes or make a loopback transition to a same node (where the source and the target states are the same node). A trigger may be defined as an event that is input into the SM where the input causes or invokes a transition from a current state to a next state. Each state may generally have any number of incoming and outgoing transitions. The SM may also have at least one initial or starting state and at least one ending state.

A SM may be represented in any suitable form. For example, as illustrated in figures described herein, a SM may be represented as a directed graph with nodes and edges. As a variation, a SM may be represented using one or more tables of information that specify, for a current state and each possible trigger or input, what is the next state to transition into from the current state.

In at least one embodiment in accordance with the techniques herein, a SM may be used to model the processing flow for a request, such as a management command on the control or management path. The management command may be any suitable command or data storage system management request where servicing the request may include reading and/or updating the data storage system configuration information stored in a database. For example, as also discussed elsewhere herein, the command may be to create or provision storage from a new LUN, configure a new RAID group, configure remote replication that provides for remote replication of a source LUN on a first data storage system on a second LUN of a second remote data storage system, a query to return information viewed on a data storage management GUI (e.g., a query to list information about one or more LUNs, one or more host systems, one or more RAID groups, one or more PDs), and the like.

Generally, the processing performed to service or implement a command may be performed in a logical sequential order. For a current step performed, processing may advance to a next processing step if the current step completed successfully. Otherwise if an error occurs when performing the current step, processing may advance to a next state that performs an error handling action, such as to undo, rollback or reverse one or more previously performed steps. In this case, each processing step denoting a portion of the workflow performed may be represented by a state in the SM. The outcome or result of the processing step or state may be used as a trigger to transition to the next state or step. Thus, in at least one embodiment, the workflow performed in implementing a management request or command may be modeled using a SM.

In at least one embodiment in accordance with the techniques herein, a SM framework may be provided that includes APIs (application programming interfaces) that may be used by a developer or user that implements the data storage management commands. The developer may specify the workflow or logic performed to implement a command as a series of steps or tasks. Each step or task may be implemented as a method, routine, function or other code entity depending on the embodiment. The developer may provide the tasks embodied, for example, as routines or functions that perform the workflow steps. The developer may also provide corresponding rollback tasks that undo the workflow of the various tasks. The developer may then invoke the APIs of the SM framework to represent or define the tasks and the corresponding rollback tasks as different states in the SM, and then generate or build the SM for the command. In at least one embodiment, the SM framework may be used to automatically define the SM transitions in the generated SM for the command. In at least one embodiment, the generated infrastructure of the SM automatically converts the tasks and rollback tasks into states, creates the appropriate transitions between the states, and adds logic for converting the outcome or result of a task into a trigger. The trigger is then fired as an input into the generated SM to drive the current state of the SM to a next subsequent state based on the trigger.

In addition to the foregoing self-driving behavior of the SM, the SM also guarantees atomic transactional consistency of each state, step or task in that all processing of a single step or task (and thus state) is either performed, or none of the sub-steps of the single step, task or state are performed.

As an example, consider a command that a developer has represented as a series of 4 tasks. The developer may encode the logic necessary to implement the command by performing the 4 tasks in sequential order as follows: task 1, task 2, task 3 and task 4. The developer may also encode the logic necessary to undo the work or processing performed by the task 1, task 2 and task 3. Thus, generally, in at least one embodiment, the user may provide routines or code entities for the N tasks executed in sequential order to implement the command. The user may also provide routines or code entities for rolling back, reversing or undoing the processing, such as any modifications or updates to a database, performed by the first N−1 tasks. Specifically, task 1 rollback undoes or rolls back the processing performed by the task 1, task 2 rollback undoes or rolls back the processing performed by the task 2, and task 3 rollback undoes or rolls back the processing performed by the task 3. For example, if the task 1 adds 2 new rows in a table of the data storage system configuration information stored in the database, then the task 1 rollback deletes the 2 new rows added by the task 1. It is assumed that if a failure occurs when performing task N, error handling performed responsive to the failure includes undoing prior processing performed by the tasks 1 through N−1 by invoking the appropriate task rollbacks in the reverse order in which the tasks are performed.

Using an API of the SM framework, the user specifies or identifies the routines for the tasks and rollback tasks to the SM framework. In turn, the SM framework defines the tasks and associated rollbacks as states of the SM. The API call may specify the sequential order in which the tasks 1-4 are invoked to successfully complete processing to implement the command. In at least one embodiment, the API call may provide a pointer or reference to the routine or other body of code implementing each of the tasks. During runtime when the SM is activated and executed to process a command instance, control may be passed to the appropriate task at runtime such as by transferring control to the address of a routine or function implementing the task logic. Continuing with the above example, the API call for the command may result in defining 7 states of the SM for the 4 tasks and the 3 rollback tasks. Subsequently, a user may invoke another second API call, for example, that generates the SM for the command. As discussed below in more detail, the generated SM may include the foregoing 7 states particular to this SM as well as an initial or starting state, a final state denoting a successful ending state, and an error or failure state denoting an ending state when an error or failure in processing occurs. The generated SM may also include the transitions between the various states based on the sequential order in which the tasks 1-4 are performed in connection with implementing the command. As noted above in at least one embodiment, the sequential order may be specified or denoted implicitly, for example, by the particular order in which the tasks are identified to the SM framework in the API call.

It should be noted that an embodiment may use any suitable number of APIs and API calls in connection with implementing the techniques described herein. For example, in at least one embodiment, a different API call may be made to identify each task and its corresponding rollback task, if any. Thus, for example, 4 API calls may be made for the above-noted 4 tasks and each such call (other than the API call for task 4) also identifies an associated rollback task. For example, the 4 API calls may be made in sequential order as follows:

Add (Task 1, Task 1 rollback)
Add (Task 2, Task 2 rollback)
Add (Task 3, Task 3 rollback)
Add (Task 4)

In at least one embodiment, the sequential order in which the foregoing 4 API calls are made denotes the particular sequential order in which the tasks are performed to implement the command. Additionally, the reverse of the sequential order in which the 4 tasks are performed also denotes a reverse ordering in which the rollback tasks are performed upon the occurrence of an error or failure trigger in a particular state. For example, the assumption is that the tasks are performed in the sequential order of task 1, task 2, task 3 and task 4. In the event a failure trigger is published or fired in connection with the state for task N, where N>1, rollback tasks are sequentially performed for all the tasks N−1 through 1.

Figure 3:
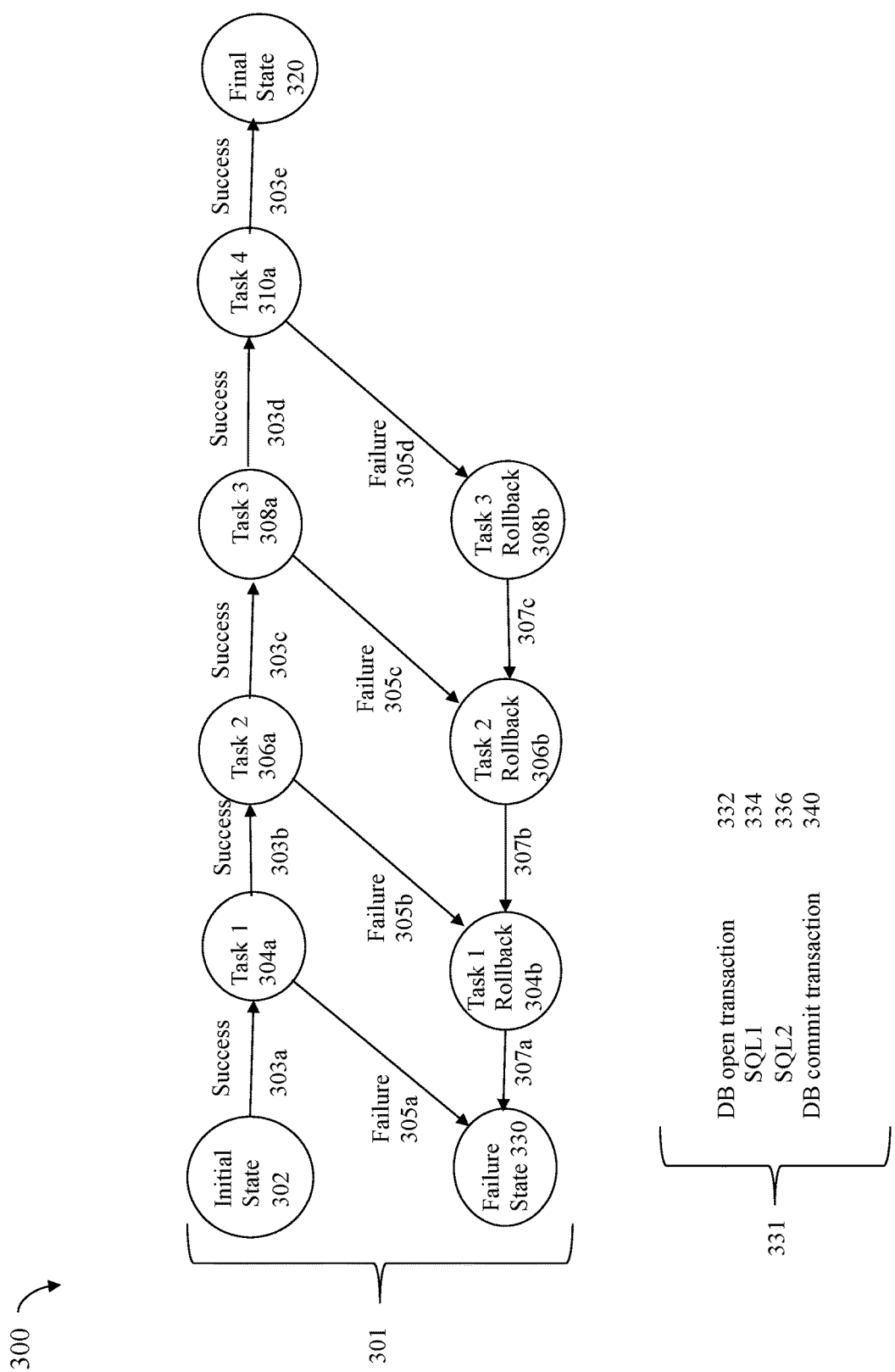
FIGS. 3, 5 and 6 are examples that include state machines (SMs) generated in an embodiment in accordance with the techniques herein and associated processing that may be performed by states of the state machine in an embodiment in accordance with the techniques herein.

Referring to FIG. 3, shown is an example representing the SM 301 generated using the SM framework in an embodiment in accordance with the techniques herein. The FIG. 3 also includes a sequence of commands 331 described in more detail below. The element 301 of FIG. 3 denotes a representation of the SM generated for the 7 tasks of the example described above. In FIG. 3, the SM 301 includes the following states: the initial state 302, the task 1 304a, the task 2 306a, the task 3 308a, the task 4 310a, the final state 320, the failure state 330, the task 1 rollback state 304b, the task 2 rollback state 306b and the task 3 rollback state 308b. The arrows denote the transitions 303a-e, 305a-d and 307a-c. In this example 301, possible triggers/inputs are success and failure.

The state 302 denotes the initial or starting state of the SM. Once the SM starts, a success trigger is generated resulting in transitioning 303a from the state 302 to the state task 1 304a. When the current state is the task 1 304a, firing a success trigger results in transitioning 303b from the state 304a to the state 306a. When the current state is the task 1 304a, firing a failure trigger results in transitioning 305a from the state 304a to the failure state 330.

When the current state is the task 2 306a, firing a success trigger results in transitioning 303c from the state 306a to the state 308a. When the current state is the task 2 306a, firing a failure trigger results in transitioning 305b from the state 306a to the task 1 rollback state 304b, and then transitioning 307a from the state 304b to the failure state 330. It should be noted that no additional input or trigger is fired in connection with transitioning from the state 304b to the state 330.

When the current state is the task 3 308a, firing a success trigger results in transitioning 303d from the state 308a to the state 310a. When the current state is the task 3 308a, firing a failure trigger results in transitioning 305c from the state 308a to the task 2 rollback state 306b, transitioning 307b from the state 306b to the state 304b, and then transitioning 307a from the state 304b to the failure state 330. It should be noted that no additional input or trigger is fired in connection with transitioning from the state 306b to the state 304b, and transitioning from the state 304b to the state 330.

When the current state is the task 4 310a, firing a success trigger results in transitioning 303e from the state 310a to the final state 320a. When the current state is the task 4 310a, firing a failure trigger results in transitioning 305d from the state 310a to the task 3 rollback state 308b, transitioning 307c from the state 308b to the state 306b, transitioning 307b from the state 306b to the state 304b, and then transitioning 307a from the state 304b to the failure state 330. It should be noted that no additional input or trigger is fired in connection with transitioning from the state 308b to the state 306b, transitioning from the state 306b to the state 304b, and transitioning from the state 304b to the state 330.

In the embodiment of the techniques herein described in connection with FIG. 3, the SM framework may automatically define the transitions between the states based on the user provided tasks. The user does not need to specify the transitions in connection with this automated SM generation embodiment. Rather, in the embodiment described in connection with the SM 301 of FIG. 3, the transitions are automatically determined indirectly based on the states, the sequential ordering of the state, and the default triggers of success and failure. In other words, the SM framework may use default triggers of only success and failure, whereby the SM framework automatically defines the SM transitions based on the success and failure triggers, based on the sequential order in which the tasks are performed in connection with success triggers, and based on the sequential order in which the particular rollback tasks are performed in connection with failure triggers. Additionally, the SM may be characterized as self-driving in that the SM converts the outcome or result of processing performed for a task or state into a trigger, such as success or failure, and then uses the trigger as an input to the SM to transition to the next subsequent state.

In at least one embodiment, the data storage system may store the SM generated for the command. At a later point in time, a data storage system administrator or manager may subsequently issue one or more instances of the command over the control path. The data storage system may receive the instances of the command and use the SM to service or implement the received instances of the command.

In at least one embodiment in accordance with the techniques herein, the generated SM may also ensure atomic transactional consistency for each state, step or task, where either all the sub-steps of each state, step or task are implemented atomically, or none of the sub-steps are implemented. Generally, an embodiment may ensure the foregoing in any suitable manner although examples are provided herein for illustration. In connection with implementing a command such as a data storage system management command, processing may include reading and/or updating the database (DB) of data storage system configuration information. The DB may provide support for updating or modifying the DB using the concept of a DB transaction, where the single DB transaction may include performing multiple update operations. The multiple operations of the single DB transaction may be committed and then applied as an atomic unit to the DB so that other users of the DB will view the DB content as either having all operations of the single DB transaction applied, or no operations of the single DB transaction applied. In such an embodiment, each state of the SM may have an associated single DB transaction that includes all DB updates or modification operations. Generally, the DB transaction may be opened at the start of processing for the state and then committed when processing for the state has completed. The DB transaction may be opened, for example, in response to performing the initial or first DB modification operation of the state. At the end of the processing performed for the state, the DB transaction may be committed as an atomic unit whereby all DB modification operations in the DB transaction are reflected in the DB. With respect to views of the DB by another process, the DB content has a consistency property maintained where the DB content either reflects the DB content without performing any of the DB modification operations of the DB transaction, or alternatively reflects the DB content updated as a result of performing all the DB modification operations of the DB transaction.

In at least one embodiment in accordance with the techniques herein, the SM may manage the DB transactions used to perform atomic transactional DB updates or modifications made, for example, by developer or user supplied code for tasks and states of the SM, by code that is not developer or user supplied such as code that is part of the SM framework that persists SM internal state information, and the like. The foregoing is described in more detail elsewhere herein.

The SM framework and infrastructure may provide an interface, such as another API call, defined method, and the like, that may be invoked by code of a developer provided code entity, such as a task corresponding to a state, when performing DB update or modification operations, such as SQL commands that update or modify the content of the DB. For example, rather than directly issue the SQL command, the developer supplied code for a task may issue the SQL command to the DB indirectly by invoking the defined method or API call of the SM framework. In turn, the invoked method or API call may perform processing to open and/or update the DB transaction. Once the processing for the task or state has completed, the DB transaction may be committed to the DB. To further illustrate with reference to the element 331 of FIG. 3, consider code of task 2 306*a* which may perform 2 DB operations—SQL1 and SQL2—that update data storage system configuration information of the DB. The developer supplied task 2 306*a* may include code that performs a first method call into code of the SM infrastructure to issue SQL1. The first method call may determine that no DB transaction is currently open for task 2 306*a* whereby SQL1 is the first DB operation that modifies the DB. The first method call may issue the DB open transaction command 332 to open the DB transaction for the current state, task 2 306*a*, and then issue the DB command or instruction SQL1 334 which is included in the currently opened DB transaction for the state 306*a*. With the DB open transaction 332, all SQL commands included in the DB transaction may not yet be applied or committed to the DB. In at least one embodiment, the DB command SQL1 334 may be applied to a local or buffered copy of the DB table(s). The local or buffered copy may be written out and committed to the global copy of the DB tables (as stored in the DB and used by other DB users) once the currently open DB transaction is committed.

The developer supplied code task2 306*a* may then issue a second method call into code of the SM infrastructure to issue SQL2. The second method call may determine that there is currently a DB transaction open for task 2 306*a* and then issue the DB command or instruction SQL2 336 which is included in the currently opened DB transaction for the state 306*a*. As with the command SQL 1 334, the command SQL2 336 is applied to the local or buffered copy of the DB tables. When code of the developer supplied code task 2 306*a* has completed, the SM infrastructure may then issue the DB commit transaction command 340. The DB commit transaction command 340 may then atomically commit and update the contents of the DB (e.g., the global copy of the DB tables stored in the DB) with the local or buffered copy of the DB tables. In this manner, the DB may be updated atomically to include the aggregated set of modifications for all the SQL commands 334, 336 of the committed transaction. Subsequent to successfully committing the DB transaction 340 for the state 306*a*, the SM may generate a success trigger used to drive the SM and transition 303*c* from the state task 2 306*a* to the next state, task 3 308*a*.

A failure may also occur while the DB transaction for the state 306*a* is open. For example, an error may occur when executing the command SQL1 334 on the local copy of the DB tables or when committing the DB transaction 340. In this case, the DB transaction may be aborted whereby the modifications made by any of the executed SQL commands 334, 336 are not committed and not applied to the DB. In this case, the SM may generate a failure trigger used to drive the SM and transition 305*b* from the state task 2 306*a* to the next state, task 1 rollback 304*b*. Once the state 304*b* processing has completed, the SM then transition 307*a* to the failure state 330 without a further trigger.

Consistent with other discussion herein, the general processing in connection with the SM 301 of FIG. 3 includes executing a task for a current state and determining an outcome, result or status of the execution of the task for the current state. Based on the outcome, result or status of the current state, the next trigger is automatically determined by the SM infrastructure. Based on the next trigger and the current state, the SM infrastructure determines the next state and then transitions to the next state. The transitioning may include transferring control to code of another developer supplied task that performs processing for the next state.

In at least one embodiment in accordance with the techniques herein, the generated SM may persistently store SM internal state information that may be used in connection with allowing the SM to resume processing in the event of a system crash while processing a command. Subsequent to a system crash occurring when the SM is performing processing in connection with a particular state for the command, the persisted SM internal state information may be used to allow the SM to resume processing the command at the start of the particular state that was being executed at the time of the crash. In at least one embodiment with reference to FIG. 4, the SM may persistently store SM internal state information 410 when processing each state completes. For example, a first set of SM internal state information may be persistently stored after completing processing of the state 304*a*, a second set of SM internal state information may be persistently stored after completing processing of the state 306*a*, a third set of SM internal state information may be persistently stored after completing processing of the state 306*a*, and so on, as each state of the SM in the example 300 is completed. In such an embodiment, the SM may persistently store the sets of the SM internal state information 410 in the DB. More generally, the sets of the SM internal state information 410 may be persistently stored in any suitable manner.

In at least one embodiment, each set of the SM internal state information 410 may include information 412 identifying the state whose processing has just completed. The state 412 may be denoted by a string or other identifier uniquely identifying the particular one of the states just completed.

The SM internal state information 410 persisted may also include user context information 414. The user context information may include any desirable information that may be used by different developer supplied code entities, such as tasks and task rollbacks, in an embodiment. In at least one embodiment, the user context information may be specified, for example, as a parameter of the 4 API calls discussed above identifying the tasks and rollbacks. For example, the API call:

Add (Task 1, UC1A, Task 1 rollback, UC1B)

may be as described above with the additional first optional parameter UC1A that is an input parameter in which the developer or user provides the user context information for the particular task, Task 1, and with the additional second optional parameter UC1B that is an input parameter in which the developer or user provides the user context information for the particular rollback task, Task 1 rollback. When the SM transfers control at runtime to Task 1 (e.g., state 304a) when processing an instance of the command, the SM also provides the user context, UC1A, as an input to Task 1. When the SM transfers control at runtime to Task 1 rollback (e.g., state 304b) when processing an instance of the command, the SM also provides the user context, UC1A, as an input to Task 1 rollback. Generally, the user context information may be any suitable information used by the developer provided code for the states, where the code is invoked at runtime by the SM when processing command instances. For example, the user context information for a state, such as task 1, may identify the particular LUN using a LUN ID (identifier) specified at runtime as a command parameter when creating a new LUN with a particular command instance. The user context information may include, for example, the unique LUN ID uniquely identifying the LUN instance in the tables of the DB of data storage system configuration information. Generally, the user context information may include parameters having values determined at various times. For example, the user context may include parameters having values determined when building the SM, or when a particular command instance is executed at runtime. The LUN ID is an example of user context information having a value determined at runtime when the SM is invoked to process a command instance. The user context information may specify appropriate syntax indicating that a particular command parameter for LUN ID is evaluated at runtime and included in the user context information. Generally, information in the user context passed as a parameter to a code entity corresponding to one of the states may be further propagated up a runtime call chain. For example, user context information may be provided from a task N to the task N−1 rollback, where the user context information may be further propagated to task N−2 rollback, task N−3 rollback, and so on, up to the task 1 rollback. Each task or task rollback corresponding to a state in the call chain may further add or modify information in the user context information where such changes are then provided to any subsequent code entity in the call chain.

The SM internal state information 410 persisted may also include the SM metadata 414, denoting other information used internally by the SM. The SM metadata 414 may include, for example, the current trigger denoting the outcome or result of the state processing just completed. Another example of the SM metadata 414 is described elsewhere herein in connection with a counter denoting a current retry count. More generally, the SM metadata 414 may include any information used by the SM in an embodiment in accordance with the techniques herein.

In at least one embodiment, each set of the SM internal state information 410 may be persistently and atomically stored in the DB including the data storage system configuration information. For example, in a manner similar to that as discussed above in connection with the element 331 of the FIG. 3, the one or more DB operations that write the SM internal state information 410 to the DB may be included in a DB transaction that is then committed to the DB after processing for a state of the SM has completed.

In at least one embodiment in accordance with the techniques herein, processing performed to persistently store sets of the SM internal state information 410 may be further optimized. In connection with the optimization that may be characterized in one aspect as a performance optimization, the DB commands, that persistently store the SM internal state information 410 to the DB after completing processing for a particular task state, may be included in the same DB transaction as other DB commands of the developer supplied code for the particular task or state. For example, the DB commands that store the SM internal state information 410 for the state 306a may be included in the same DB transaction as the SQL commands 334, 336. In such an embodiment, for example, the sequence of DB commands denoted by the element 331 may include one or more additional DB commands that store the SM internal state information 410 between the commands lines 336 and 340.

Additionally, an embodiment may further optimize persistently storing the SM internal state information 410 for a state, where the SM internal state information 410 may only be persisted for the state if a DB transaction has been opened for the state. Consistent with discussion above, a DB transaction for the state may be opened when there is a DB command executed as part of the developer supplied code for the task or state and the DB command modifies or updates the contents of the DB. Generally, the DB commands included in the code for the task or state may include other commands, such as query commands that only read or retrieve information from the DB without modifying the DB. When there are no DB commands executed during processing steps of the state that modify the DB, the DB transaction may not be opened for the state. In such a case, an optimization may be performed to omit persisting the SM internal state information for the state. With this optimization, a state may have an associated set of SM internal state information 410 persisted only when the task performing processing of the state includes one or more commands that modify the DB. In such an embodiment in which a set of SM internal state information 410 may not be persisted for every completed state of the SM, should a system crash occur, the SM will subsequently resume processing subsequent to the last persisted state described by the last set of SM internal state information persistently stored to the DB. Thus, use of the foregoing performance optimization regarding when SM internal state information is persisted to the DB may provide for an improvement in performance by reducing the number of DB transactions and DB operations performed.

An embodiment may also provide an override option in connection with this optimization in instances where the SM may be required to always persistently store a set of SM internal state information 410 for the state independent of whether processing of the developer supplied task for the state includes a DB command that modifies the DB. For example, an embodiment may provide a flag as an input parameter of an API call, such as the Add API call described above when adding or identifying SM tasks. The developer or user may set the flag to indicate that for a particular task of the API call, and thus the state formed from the particular task, the SM internal state information 410 for the particular state is required to be persistently stored.

In at least one embodiment, an error policy may optionally be specified as a property of each task. The error policy may indicate whether processing of the task, and thus state generated from the task, is to be retried more than once should a failure or error result during the task processing. With reference back to FIG. 3, the SM 301 generally provides for transitioning to task rollback processing if any state or task results in a failure. The failure trigger may be generated in connection with the SM 301 of FIG. 3 the first time processing of the task or state results in an error or failure. As a variation, the error policy may indicate to retry the task or state up to a specified maximum number of times. In this manner, the state may transition back to itself up to the maximum number of times. If an error or failure occurs during processing of the task or state the maximum number of times, then a failure trigger is generated causing transitioning out of the state to another state associated with task rollback processing. In at least one embodiment, the error policy for a task and associated state may identify MAX, that is an integer value denoting the specified maximum number of times that processing of the task, and thus associated state, may be retried in the event an error or failure occurs during task processing. By default, an embodiment may set MAX to 1 and achieve the behavior as described above in connection with FIG. 3.

In connection with implementing the retry processing of the error policy for values of MAX>1, the SM may also include an additional trigger besides the success and failure triggers described above. In at least one embodiment, the generated SM may also include the retry trigger and additional associated transitions which will now be described with reference to the FIG. 5.

The element 501 denotes a modified SM in comparison to the SM 301 of the FIG. 3. The SM 501 includes the same states and transitions as described in connection with the SM 301 of FIG. 3 with the additional transitions 502a-d that provide for loopback transitions to the same state when a retry trigger is published or fired. The number of times that each of the states 304a, 306a, 308a and 310a is allowed to transition back to itself depends on the particular value of MAX specified for each such state. A different value of MAX may be specified individually for each of the states 304a, 306a, 308a and 310a. For example, assume that for the state task 2 306a, MAX=2. The SM infrastructure may keep a counter denoting the number of times that processing of the task 2 306a has resulted in an error or failure. Initially, the counter may be 0. The processing of the task 2 306a may be performed a first time resulting in an error. The SM infrastructure may increment the counter to a revised value of 1 denoting the number of times that processing of the task 2 306a has resulted in an error or failure. Processing by the SM infrastructure may compare the current value of counter to MAX. If the current value of the counter is more than MAX, a failure trigger may be published, thereby causing the SM 501 to transition 305b from the state 306a to the state 304b, and then to the state 330. Otherwise, if the current value of the counter is not more than MAX, a retry trigger may be published, thereby causing the SM 501 to transition from the state 306a to the state 306a.

Figure 4:
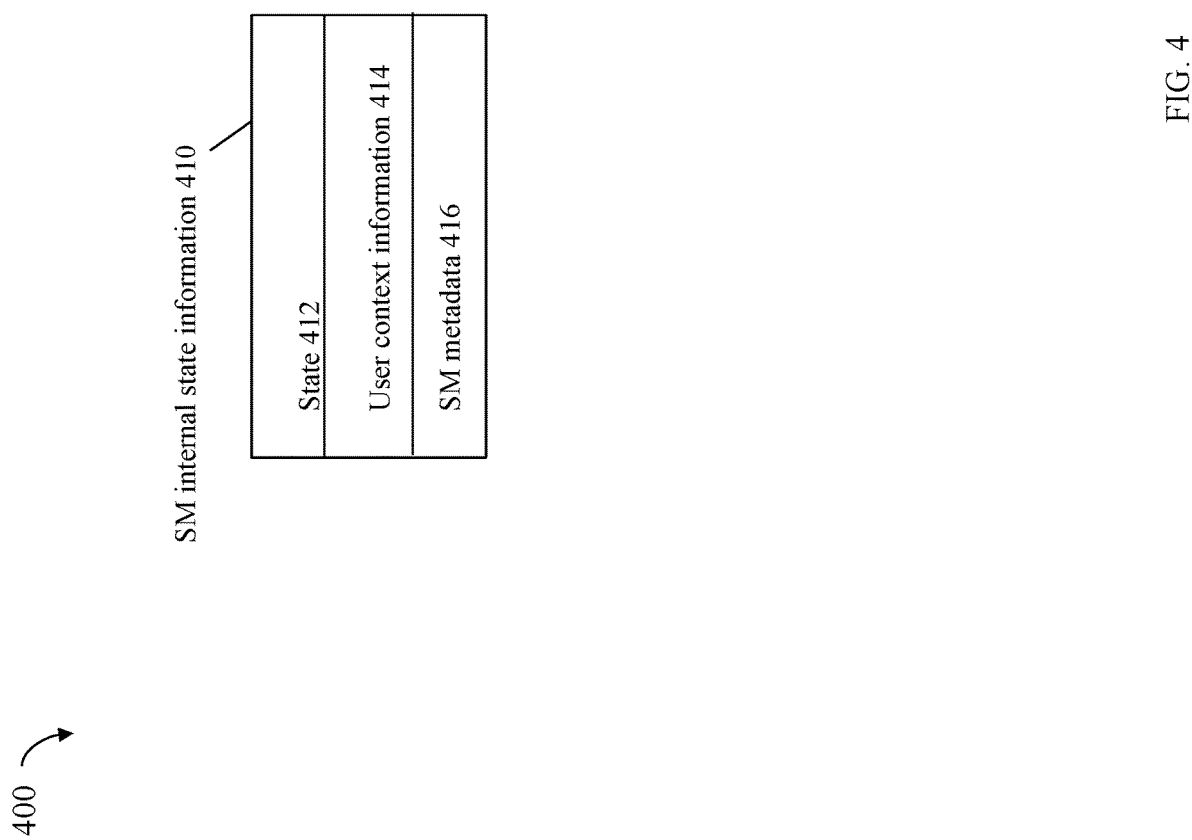
FIG. 4 is an example of SM internal state information that may be used in an embodiment in accordance with the techniques herein.

In an embodiment of the SM 501 having the counter values, the retry trigger, and the additional transitions associated with the retry trigger, the current value of each counter may be included in the SM metadata 416 of the SM internal state information 410 as described in connection with FIG. 4. In such an embodiment, the current value for the counter associated with a particular state of the SM 501 may be persistently stored in the information 410 for the SM 501. The manner in which the information 410 for the SM 501 may be persisted in at least one embodiment is illustrated in connection with the logic and processing of the element 530 described below in more detail.

In at least one embodiment, the current value for the retry counter, as well as generally the current instance of the SM internal state information for a state, may also be stored in memory. The in-memory copy may then be updated or retrieved as needed such as when persistently storing the information, or when repeating processing of a particular state as part of retrying processing of the state. The persisted value of the counter may be used subsequent to a system crash as described elsewhere herein in connection with general use of the persisted information 410. Subsequent to the system crash, the SM 501 may be restarted and may resume processing at the start of the state that was being executed when the prior system crash occurred. The state at which processing is resumed is based on the last or most recently stored set of SM internal state information. For example, assume that processing for the state task 2 306a executes a first time. Assume that the state 306a results in processing performed as denoted by the steps or commands 332, 334 and 336 of 530, where the elements 332, 334 and 336 are as discussed above in connection with the FIG. 3. When executing the command SQL2 336 in this example 530 with the SM 501, an error occurs and the currently open DB transaction (332) including the command SQL2 is aborted 532. Subsequent to the step 532, the counter (denoting the number of times the processing of the state 306a resulted in an error), is incremented from 0 to 1 in the step 534. Subsequent to the step 534, a new DB transaction 2 is open in the step 536. Subsequent to the step 536, the step 538 is performed to include the DB command(s) that store the SM internal state information for the state 306a in the open DB transaction 2 (opened in the step 536). From the step 538 processing proceeds to the step 542 where the DB transaction 2 (opened in the step 536) may then be committed. As a result of the DB commit operation in the step 542 that commits the DB transaction 2, the SM internal state information for the state 306a is committed and persistently stored, where the SM internal state information includes the current counter=1 for the state 306a.

Continuing with the above example, execution of the task for the state 306a the first time results in the first error denoted by 532. Assume that MAX is 2 for the state 306a. Since the current counter value of 1 does not exceed the value of MAX, the first error results in publishing a retry trigger and the SM 501 remains in the state 306a, where processing for the state task 2 306a executes a second time. When performing processing the second time for the state task 2 306a, assume the same error occurs as denoted 532. Additionally, assume that the system crashes when the SM 501 is performing processing for the state task 2 306a during the second time. Subsequent to the crash, the SM 501 restarts and retrieves the last or most recent stored set of SM internal state information 410 denoting the state of execution after completing processing of the state 306a the first time as described above. The SM internal state information previously for the first execution of the state 306a is now retrieved and loaded for use with the SM 501. The SM internal state information for the first execution of the state 306a may include state information 412, such as a string identifying the state as task 2 306a, and may also include a counter value of 1 in the SM metadata 416. In this case, the SM 501 may process the SM internal state information for the first execution of the state 306a and resume processing by restarting execution in the state 306a for the second time using the current counter value of 1. In particular, the state field 412 of the loaded SM internal state information identifies the particular state and associated task to restart. Additionally, the SM metadata 416 includes the counter value of 1 to be used when restarting processing for the state 306a. Using this counter value of 1 corresponds to restarting execution of processing for the state task2 306a the second time.

Figure 5:
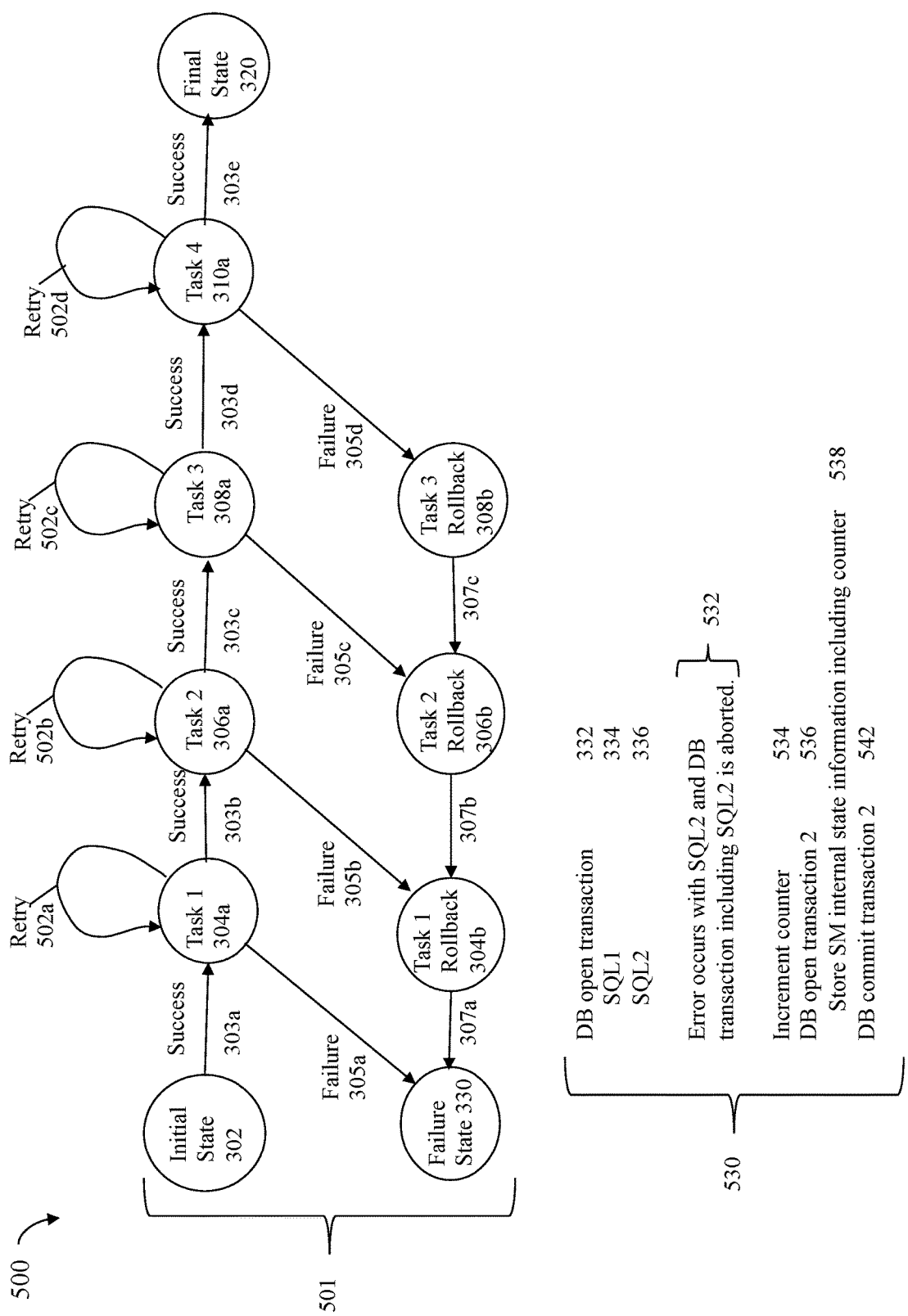

The examples in the foregoing paragraphs and figures, such as FIGS. 3 and 5, illustrate having the SM framework or infrastructure automatically determine and generate all the transitions between specified states. An embodiment may also have the SM framework provide one or more additional APIs that may be used by a developer or user of the SM framework to manually build some or all of the SM. For example, an embodiment may include the API Define_transition allowing a developer to manually specify a transition between a source state and a target state. As an example, the SM 301 of FIG. 3 may be specified as described above. However, a developer may further modify the SM 301 to replace the transition 303e with a new transition from the state 310a to the state 304a when a Success trigger is published or fired while in the state 310a. To further illustrate, reference is made to the example SM 301 of FIG. 3 and the following API call:

Define_transition (Task 4, trigger=Success, Task 1)

With reference to FIG. 3, the above-noted API call manually defines a transition from the source state=Task 4 310a to the target state=Task 1 304a responsive to the Success trigger occurring when in the state source state.

In at least one embodiment, as a complete example, a developer may use the above-noted Define_transition API to further modify or amend the SM 301. For example, the developer may issue the 4 Add API calls described above to define tasks and associated rollbacks in sequential order as follows:

Add (Task 1, Task 1 rollback)
Add (Task 2, Task 2 rollback)
Add (Task 3, Task 3 rollback)
Add (Task 4)

Subsequently, the developer may then issue the following API call:

Define_transition (Task 4, trigger=Success, Task 1)

Figure 6:
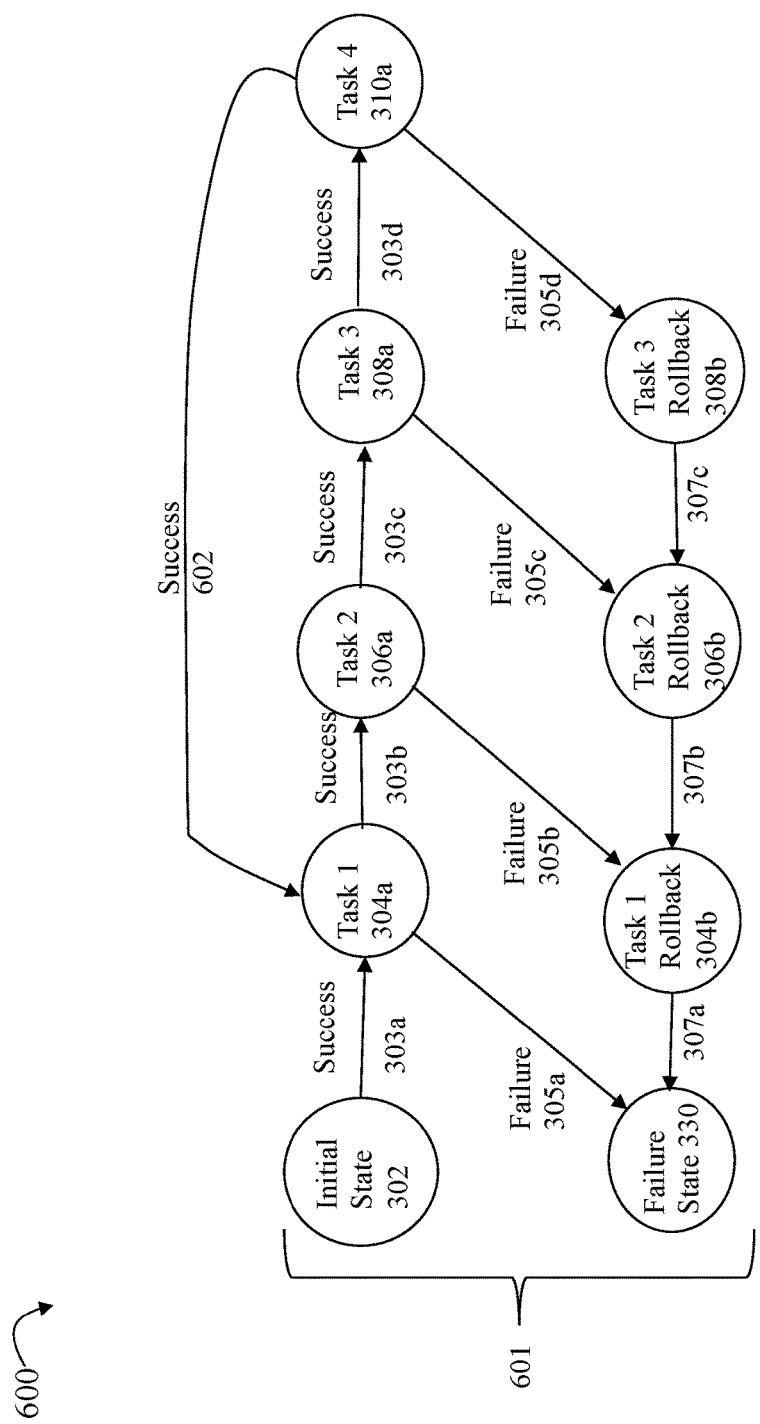

Finally, the developer may issue another API call or command to the SM framework, which causes the SM framework to generate the SM 601 as illustrated in the FIG. 6. The SM 601 is similar to the SM 301 of FIG. 3 with the following differences: the SM 601 includes the new transition 602 defined based on the above-noted Define-transition API call; and the state 320 and the transition 303e are removed in the SM 601.

A developer may choose to manually define all the transitions in the SM 501 or other desired SM by making multiple Define_transition API calls. Generally, a developer may choose to manually define one or more of the transitions in the SM 501 or other desired SM by making Define_transition API calls. More generally, an embodiment in accordance with the techniques herein may also provide additional APIs for a developer to use to specify other aspects of the generated SM. For example, an additional API may allow a developer to define a new trigger.

In at least one embodiment, the SM framework may also allow a developer or user to define handlers that are invoked at runtime when processing a command instance. The developer may specify a routine, function or other code entity as a handler. The SM framework may provide for calling, invoking or transferring control at runtime to the handler at particular points in time when the generated SM is processing a command. In at least one embodiment, the SM framework may provide support that allows a user to specify 3 handlers that execute any desired logic when a state is entered, when a state is exited, and when a transition is taken. As an example, the 3 handlers may be defined as follows:

onExit (Sn)—This handler is invoked when the state Sn is exited. The parameter Sn is an input parameter to the handler uniquely identifying the state that is exited.

onEnter (Sn)—This handler is invoked when the state Sn is entered. The parameter Sn is an input parameter to the handler uniquely identifying the state that is entered.

onTransition(Tn)—This handler is invoked when the transition Tn is taken. The parameter Tn is an input parameter to the handler uniquely identifying transition taken.

An embodiment may use any suitable means to allow a user to define or identify the handlers to be invoked by the generated SM at runtime when the SM is invoked to process a command. For example, an embodiment may provide an API that allows a user to identify the particular handlers invoked when entering a state, exiting a state, and taking a transition.

To further illustrate, when taking a transition T1 from the source state S1 to the target state S2, the following denotes the logical sequential flow in which the above-noted 3 handlers are invoked at runtime when the SM processes a command: onExit (S1), onTransition (T1), onEnter (S2). In this manner, the SM may transfer control to the above-noted-3 handlers at runtime when processing a command.

In at least one embodiment in accordance with the techniques herein, a developer supplied task, which is converted to a state in the SM, may send one or more messages, requests, or generally communications, as part of its processing performed at runtime when servicing a command. For example, consider a command workflow defined by a developer when configuring remote replication for a LUN on a first data storage system. In connection with remotely replicating the LUN on a second data storage system that is remotely located with respect to the first data storage system, the processing performed may include sending multiple messages or requests. For example, task M may be one of the tasks of the workflow for configuring remote replication for LUN A. The task M may send 3 messages or requests as part of its processing. One message M1 may be sent, for example, from the first data storage system to the second data storage system requesting that the second data storage system create a remote replica, LUN A", for the LUN A. The message M1 may be sent as part of processing performed by the task M that configures the local and remote device pairings used for remote replication where the data from the local device, LUN A, is remotely replicated to its corresponding remote counterpart device, LUN A". In connection with messages, in order to maintain transactional consistency at the per step, state or task level of atomicity (e.g., whereby all processing of the single step, state or task occurs, or no processing of the single step, state or task occurs), an embodiment may persistently store the messages or requests as part of a DB transaction, and then send all the messages or requests of the single step, state or task at the end or close of the state. For example, assume that the state is for the task M noted above which includes processing that sends the 3 messages as described above, including the message M1. Also, assume for purposes of illustration, that the SM performs processing to persistently store an instance of the SM internal state information for the task M. In this case, the following snippet may denote a sequence of steps performed by code of the SM infrastructure to manage the DB transaction for the task M and its processing to ensure transaction consistency of the task M, where either all processing of the task M is performed or no processing of the task M occurs. In the following snippet, the operations column denotes the processing operations that may be performed in sequential order in connection with the task M, and the ID column denotes the unique identifiers of the operations for purposes of further description in the following paragraphs.

| Operations | ID |
| --- | --- |
| DB open transaction | 602 |
| Store 3 messages | 604 |
| Store SM internal state information | 606 |
| DB commit transaction | 610 |
| Send the 3 messages | 612 |
| Publish Success trigger | 614 |

In the above, the DB transaction for the task M is opened in the step 602. Following the step 602, the step 604 may be performed. In the step 604, as part of the currently open DB transaction, the SM framework issues commands to persistently store the 3 messages of the task M. Following the step 604, the step 606 may be performed. In the step 606, as part of the currently open DB transaction, the SM framework issues commands to persistently store the SM internal state information for the task M. Following the step 606, the step 610 may be performed. In the step 610, the current DB transaction (opened in the step 602) is then committed. After the step 610, the step 612 may be performed to send the 3 messages. After the step 612, the step 614 may be performed that publishes a success trigger. Consistent with other discussion herein, the processing denoted in the above snipped may be performed by code of the SM and in particular the SM framework to manage the DB transaction for the developer or user supplied task M corresponding to a state in the SM processing a command.

Referring to FIG. 7, shown is a further illustration of the example SM 301 from the FIG. 3 in at least one embodiment in accordance with the techniques herein. The example 700 illustrates some of the interactions and transfers of control between developer or user supplied code entities and code of the SM framework or infrastructure in at least one embodiment. Elements to the left of the line 701 denote developer or user supplied code entities 703a, which correspond to the 7 various tasks for which the developer provides routines, methods or other code entities. Element to the right of the line 701 denote processing performed by code of the SM framework or infrastructure 703b.

Assume that the developer or user has provided code for the tasks 702a-g, executed the 4 API calls as described above and also issued another API call or command to generate the SM having the states as in the SM 301 of FIG. 3. The developer supplied code entities represented by the tasks 702a-g of FIG. 7 correspond, respectively, to the states 304a, 306a, 308a, 310a, 304b, 306b, and 308b of FIG. 3. Also assume the task 2 702b processing includes executing the DB commands SQL1 and SQL2 as described above in connection with FIG. 3. The SM generated may include the states and transitions as in the SM 301 of FIG. 3. The generated SM may include the developer supplied code entities 702a-g (703a on the left hand side of the dashed line 701) as well as code of the SM framework (denoted by the right hand side of the dashed line 701). The code 703b represented by the left hand side of the line 701 may be included, for example, in one or more modules, libraries and like, and may be invoked at runtime when the generated SM is invoked to process a command.

In connection with the example 700 of FIG. 7, assume further that the generated SM is invoked to process a command and that the task 1 702a has completed processing successfully. The SM 301 is currently in the state 304a of FIG. 3 that corresponds to the task 1 702a of FIG. 7. At this point, control is transferred 701a from the task 1 702a to the SM framework code portion 710. The code portion 710 may include processing that publishes a success trigger at the step 710a. After the step 710a, the step 710b may be performed. In the step 710b for the defined SM 301, the SM transitions (303b) from the task 1 702a (state 304a) to task 2 702b (state 306a) based on the success trigger 710a. After the step 710b, the step 710c may be performed to transfer control 701b to the task 2 702b (corresponding to the next state 306a).

At this point, processing of the task 2 702b may commence at the start 703a and continue to the step denoted by 703b, where the task 2 702b performs an API call, DB API, to issue the DB commands, SQL1 and SQL2. In this example, the API call, DB API, results in transfer of control to code of the API in the SM framework. The DB API may be used to invoke code of the SM framework to manage the DB commands that modify or update the DB and provide for the atomic transactional consistency of operations of each state or task to ensure that all DB commands that modify the DB in the task or state occur as an atomic unit, or do not occur at all. As a result of the API call DB API at the step 703b, control transfers 701c back to the SM framework to the code portion 714.

The code portion 714 opens a DB transaction X2 for the task 2 (step 714a), includes the DB commands SQL1 and SQL2 in the DB transaction X2 for the task 2 (step 714b), and then transfers control back to the task 2 702b (step 714c). Execution of the step 714c transfers control (701d) back to the task 2 702b to continue processing at the step 702c. The step 702c may denote the next processing point subsequent to 703b where processing of the task 2 702b resumes at the next instruction following the transfer of control point 703b. Processing of the task 2 702b completes successfully (703d). Control is then transferred 701c from the line 703d of the task 2 702b to the SM framework code portion 716 that is executed next.

The code portion 716 includes the step 716a that includes one or more DB commands in the DB transaction X2 to persistently store an instance of the SM internal state information for the task 2 702b. The instance of SM internal state information persisted for the task 702b may include one or more items of information as described herein and may vary depending on the particular embodiment and properties of the task. For example, the SM internal state information persisted for the task 2 702b may include information identifying the particular state, "task2", may identify the current trigger based on processing results of the state "task 2", and possibly other information some of which is described herein. In this case, the current trigger is success based on the outcome or result of processing performed by the state or task 2 702b.

Following the step 716a, the step 716c is performed where the DB transaction X2 is committed. After the step 716c, the step 716d is performed to publish a success trigger based on the successful completion of the processing of the task 2 702b (state 306a). From the step 716d, control proceeds to the step 716e where processing is performed to determine the next state to transition into (and thus next task to invoke). In the step 716d for the defined SM 301, the SM transitions (303c) from the task 2 702b (state 306a) to task 3 702c (state 308a) based on the success trigger 716d. After the step 716e, the step 716f may be performed to transfer control 701f to the task 3 702c (corresponding to the next state 308a). Processing of the task 3 702c may now commence.

For simplicity of illustration, the example 700 of FIG. 7 does not illustrate further details regarding the particular interactions between the developer supplied code entities for tasks 703a (on the left side of the line 701) and code of the SM framework 703b (on the right side of the line 701). However, additional transfers of control between the tasks 703a and the code of the SM framework 703b may occur consistent with other discussion herein.

Thus, in at least one embodiment, the generated SM for a command may include both user or developer supplied code as well as code of the framework. At a later point in time after the SM is generated for the command, the SM may be invoked to implement, service or process an instance of the command. For example, the SM may be generated for a data storage system management command that creates or provisions a new LUN, configures remote replication for a LUN or logical group of LUNs, configures a new RAID group, configures a LUN for local replication (e.g., taking snapshots of the LUN at defined time intervals or in response to defined trigger conditions), and the like. At a later point in time, the data storage system may receive a request to perform the data storage system management command. The request may be received by the data storage system over the control or management path, for example, as issued by a storage administrator or manager. In response to receiving the request to perform the data storage system management command, the SM may be invoked to implement, service or process the request. The request may include one or more request parameters which may be characterized as runtime parameters of the command. For example, a request to create a new LUN may include runtime parameters that specify attributes or properties of the LUN to be provisioned. The runtime parameters may include, for example a LUN ID (as described elsewhere herein), a storage capacity for the LUN being created, and possibly other parameters that may vary with embodiment. The runtime parameters may be determined at runtime when the SM is invoked for processing the request and associated command instance. One or more of the runtime parameters may be included in the user context information as also described herein.

Figure 8A:
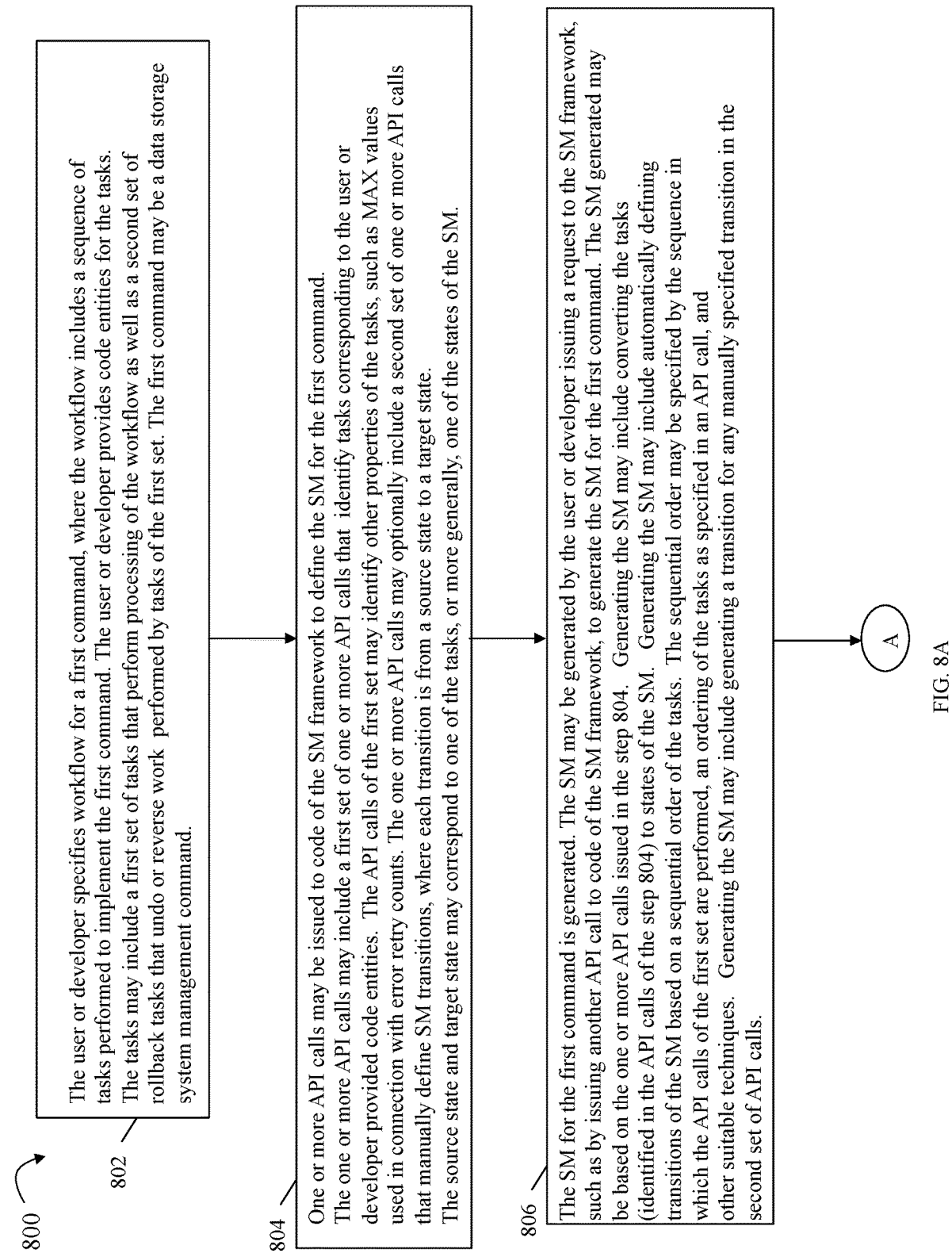
FIGS. 8A and 8B are flowcharts of processing steps that may be performed in an embodiment in accordance with the techniques herein.
Figure 8B:
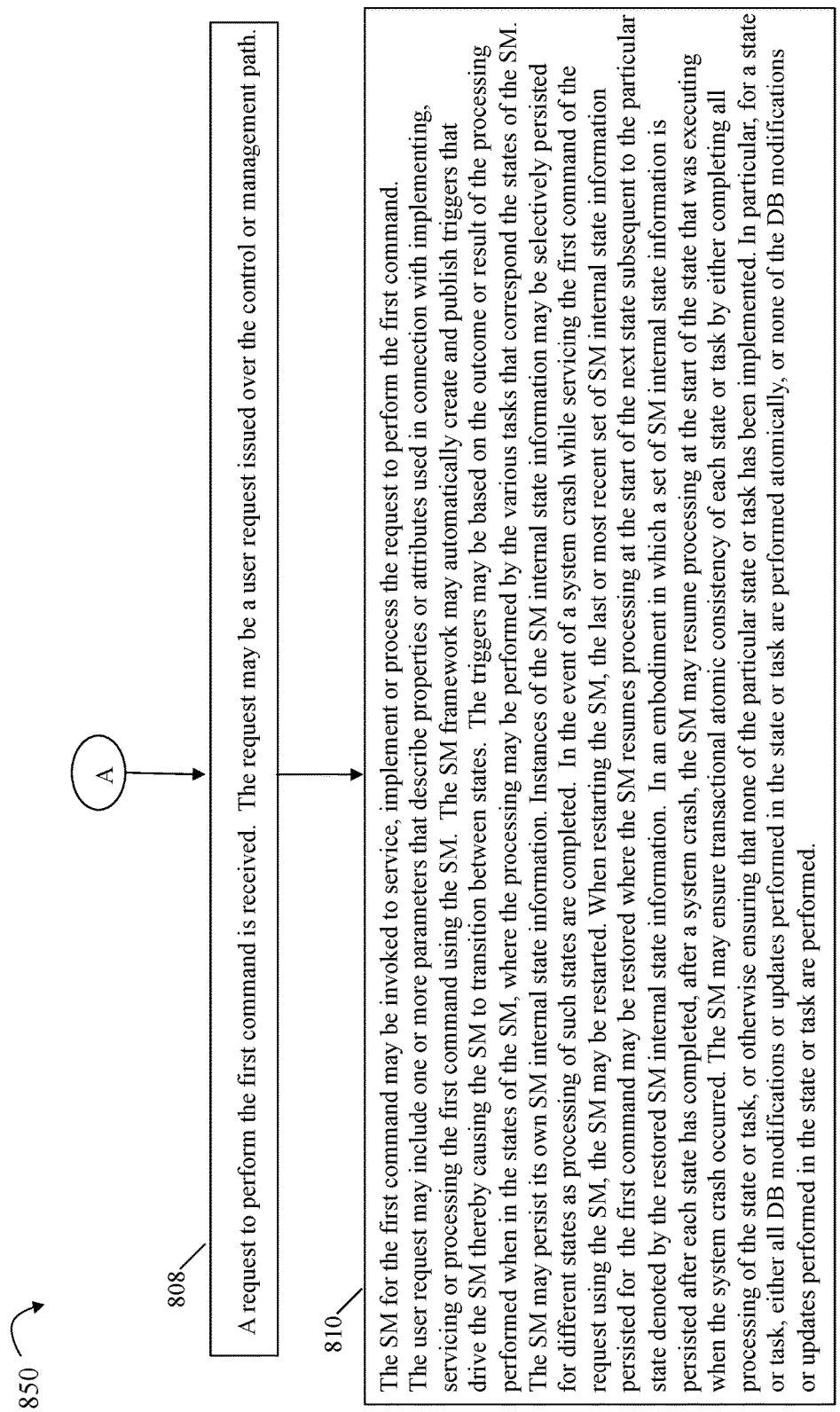

Referring to FIGS. 8A and 8B, shown are the flowcharts 800 and 850 of processing steps that may be performed in an embodiment in accordance with the techniques herein. The FIGS. 8A and 8B summarize processing described above.

At the step 802, the user or developer may specify the workflow for a first command, where the workflow includes a sequence of tasks performed to implement the first command. The user or developer provides code entities for the tasks. The tasks may include a first set of tasks that perform processing of the workflow as well as a second set of rollback tasks that undo or reverse work performed by tasks of the first set. The first command may be a data storage system management command. From the step 802, control proceeds to the step 804.

At the step 804, one or more API calls may be issued to code of the SM framework to define the SM for the first command. The one or more API calls may include a first set of one or more API calls that identify the tasks corresponding to the user or developer provided code entities. The API calls of the first set may identify other properties of the tasks, such as MAX values used in connection with error retry counts. The one or more API calls may optionally include a second set of one or more API calls that manually define SM transitions, where each transition is from a source state to a target state. The source state and target state may correspond to one of the tasks, or more generally, one of the states of the SM. From the step 804, control proceeds to the step 806.

At the step 806, the SM for the first command is generated. The SM may be generated by the user or developer issuing a request to the SM framework, such as by issuing another API call to code of the SM framework, to generate the SM for the first command. The SM generated may be based on the one or more API calls issued in the step 804. Generating the SM may include converting the tasks (identified in the API calls of the step 804) to states of the SM. Generating the SM may include automatically defining transitions of the SM based on a sequential order of the tasks. The sequential order may be specified by the sequence in which the API calls of the first set are performed, an ordering of the tasks as specified in an API call, and other suitable techniques. Generating the SM may include generating a transition for any manually specified transition in the second set of API calls. From the step 806, control proceeds to the step 808.

At the step 808, a request to perform the first command is received. The request may be a user request issued over the control or management path. From the step 808, control proceeds to the step 810.

At the step 810, the SM for the first command may be invoked to service, implement or process the request to perform the first command. The user request to perform the first command may include one or more parameters that describe properties or attributes used in connection with implementing, servicing or processing the first command using the SM. The SM framework may automatically create and publish triggers that drive the SM thereby causing the SM to transition between states. The triggers may be based on the outcome or result of the processing performed when in the states of the SM, where the processing may be performed by the various tasks that correspond the states of the SM. The SM may persist its own SM internal state information. Instances of the SM internal state information may be selectively persisted for different states as processing of such states are completed. In the event of a system crash while servicing the first command of the request using the SM, the SM may be restarted. When restarting the SM, the last or most recent set of SM internal state information persisted for the first command may be restored where the SM resumes processing at the start of the next state subsequent to the particular state denoted by the restored SM internal state information. In an embodiment in which a set of SM internal state information is persisted after each state has completed, after a system crash, the SM may resume processing at the start of the state that was executing when the system crash occurred. The SM may ensure transactional atomic consistency of each state or task by either completing all processing of the state or task, or otherwise ensuring that none of the particular state or task has been implemented. In particular, for a state or task, either all DB modifications or updates performed in the state or task are performed atomically, or none of the DB modifications or updates performed in the state or task are performed.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing a request comprising:
    defining, using a processor and a state machine framework, a state machine for the request, wherein a plurality of tasks is performed in a workflow for servicing the request, wherein the plurality of tasks is implemented by a plurality of code entities, and wherein said defining further includes:
        issuing, at a first point in time using a processor, one or more application programming interface (API) calls to the state machine framework, wherein the one or more API calls identify a defined sequential order in which the plurality of tasks and the plurality of code entities are executed, at another point in time subsequent to the first point in time, to implement and service the request at runtime;
    issuing, using a processor and subsequent to the first point in time, a second API call to the state machine framework, wherein the second API call instructs the state machine framework to generate a state machine for the request in accordance with said defining;
    responsive to receiving the second API call, generating, at a second point in time by the state machine framework and using a processor, the state machine for processing the request, wherein the state machine includes a plurality of states associated with the plurality of tasks and the plurality of code entities, wherein said generating includes automatically determining a first state transition of the state machine between a first state of the plurality of states and a second state of the plurality of states, wherein the first state corresponds to a first code entity of the plurality of code entities and the second state corresponds to a second code entity of the plurality of code entities;
    receiving, using a processor and at a third point in time subsequent to the second point in time, the request; and
    responsive to receiving the request, performing first processing using a processor and the state machine to service the request, wherein said first processing further includes the state machine framework transitioning to the first state of the state machine and invoking the first code entity corresponding to the first state.

2. The method of claim 1, wherein said generating includes automatically determining a plurality of state transitions of the state machine in accordance with the sequential ordering.

3. The method of claim 2, wherein said generating includes converting each of the plurality of tasks into a different one of the plurality of states.

4. The method of claim 3, wherein said defining further includes:
    providing a plurality of rollback tasks to the state machine framework, where each of the plurality of rollback tasks reverses processing performed by one of the plurality of tasks, wherein the plurality of rollback tasks are provided to the state machine framework in the one or more API calls, and wherein the state machine framework converts the plurality of rollback tasks to a second plurality of states of the state machine.

5. The method of claim 4, wherein said generating includes automatically determining a second plurality of state transitions of the state machine to perform rollback processing for the plurality of states.

6. The method of claim 5, wherein the second plurality of state transitions are automatically determined by the state machine framework in accordance with the plurality of tasks and the plurality of rollback tasks.

7. The method of claim 6, wherein the plurality of rollback tasks and the plurality of tasks are user-supplied code entities not included in the state machine framework.

8. The method of claim 1, wherein said first processing includes performing processing of a first of the plurality of tasks corresponding to the first state of the state machine.

9. The method of claim 8, wherein performing processing of the first task includes issuing a first plurality of instructions that perform a first plurality of updates to a database, and wherein the first plurality of instructions are included in a database transaction that atomically performs the first plurality of updates to the database.

10. The method of claim 9, wherein the database transaction includes one or more instructions that persistently stores SM (state machine) internal state information for the first task, and wherein the method includes committing the database transaction, and wherein said committing includes atomically updating the database in accordance with the one or more instructions and also the first plurality of instructions.

11. The method of claim 10, further comprising:
    determining that the first task completes successfully; and
    responsive to said determining that the first task completes successfully, generating a success trigger that drives the state machine into the second state in accordance with the first state transition.

12. The method of claim 9, further comprising:
    determining that an error occurs when the database transaction is open and not yet committed to the database;
    responsive to said error, incrementing a retry count denoting a number of times processing of the first task has resulted in an error;
    determining whether a retry count associated with the first task exceeds a maximum; and
    responsive to said determining that the retry count exceeds the maximum, generating a failure trigger that drives the state machine into a next state in accordance with a second transition of the state machine, wherein the next state corresponds to a first of the plurality of rollback tasks that reverses processing performed by an associated one of the plurality of tasks.

13. The method of claim 12, further comprising:
responsive to said determining that the retry count does not exceed the maximum, generating a retry trigger that drives the state machine into the first state in accordance with a second state transition of the state machine, wherein the second state transition is a loopback transition that causes the state machine to remain in the first state and repeat processing of the first task.

14. The method of claim 13, wherein the database transaction that is opened is aborted responsive to said error, and the retry count is included in SM internal state information for the first task that is persistently stored in the database as a result of committing a second database transaction that stores the SM internal state information for the first task to the database.

15. The method of claim 1, wherein the request is a data storage system management command issued over a control or data path.

16. The method of claim 1, wherein the first processing to service the request using the state machine is performed on a system, wherein the system crashes while performing processing of the first task for a first of the plurality of states, and wherein the method includes:
restarting the system and resuming processing to service the request at the first task in accordance with restored SM internal state information.

17. A non-transitory computer readable medium comprising code stored thereon that, when executed, performs a method of processing a request comprising:
defining, using a processor and a state machine framework, a state machine for the request, wherein a plurality of tasks is performed in a workflow for servicing the request, wherein the plurality of tasks is implemented by a plurality of code entities, and wherein said defining further includes:
issuing, at a first point in time using a processor, one or more application programming interface (API) calls to the state machine framework, wherein the one or more API calls identify a defined sequential order in which the plurality of tasks and the plurality of code entities are executed, at another point in time subsequent to the first point in time, to implement and service the request at runtime;
issuing, using a processor and subsequent to the first point in time, a second API call to the state machine framework, wherein the second API call instructs the state machine framework to generate a state machine for the request in accordance with said defining;
responsive to receiving the second API call, generating, at a second point in time by the state machine framework and using a processor, the state machine for processing the request, wherein the state machine includes a plurality of states associated with the plurality of tasks and the plurality of code entities, wherein said generating includes automatically determining a first state transition of the state machine between a first state of the plurality of states and a second state of the plurality of states, wherein the first state corresponds to a first code entity of the plurality of code entities and the second state corresponds to a second code entity of the plurality of code entities;
receiving, using a processor and at a third point in time subsequent to the second point in time, the request; and
responsive to receiving the request, performing first processing using a processor and the state machine to service the request, wherein said first processing further includes the state machine framework transitioning to the first state of the state machine and invoking the first code entity corresponding to the first state.

18. A system comprising:
a processor; and
a memory comprising code stored thereon that, when executed, performs a method of processing a request comprising:
defining, using a processor and a state machine framework, a state machine for the request, wherein a plurality of tasks is performed in a workflow for servicing the request, wherein the plurality of tasks is implemented by a plurality of code entities, and wherein said defining further includes:
issuing, at a first point in time using a processor, one or more application programming interface (API) calls to the state machine framework, wherein the one or more API calls identify a defined sequential order in which the plurality of tasks and the plurality of code entities are executed, at another point in time subsequent to the first point in time, to implement and service the request at runtime;
issuing, using a processor and subsequent to the first point in time, a second API call to the state machine framework, wherein the second API call instructs the state machine framework to generate a state machine for the request in accordance with said defining;
responsive to receiving the second API call, generating, at a second point in time by the state machine framework and using a processor, the state machine for processing the request, wherein the state machine includes a plurality of states associated with the plurality of tasks and the plurality of code entities, wherein said generating includes automatically determining a first state transition of the state machine between a first state of the plurality of states and a second state of the plurality of states, wherein the first state corresponds to a first code entity of the plurality of code entities and the second state corresponds to a second code entity of the plurality of code entities;
receiving, using a processor and at a third point in time subsequent to the second point in time, the request; and
responsive to receiving the request, performing first processing using a processor and the state machine to service the request, wherein said first processing further includes the state machine framework transitioning to the first state of the state machine and invoking the first code entity corresponding to the first state.

* * * * *